United States Patent [19]

Mouille et al.

[11] 4,255,084
[45] Mar. 10, 1981

[54] DEVICE FOR DAMPING THE VIBRATIONS OF A ROTARY-WING AIRCRAFT ROTOR

[75] Inventors: Rene L. Mouille, Aix-en-Provence; Gerard C. L. Genoux, Gardanne; Marc A. Declercq, Pelissanne; Jean-Luc M. Leman, Aix-en-Provence; Robert J. Suzzi, Marseille, all of France

[73] Assignee: Societe Nationale Industrielle et Aerospatiale, France

[21] Appl. No.: 9,614

[22] Filed: Feb. 5, 1979

[30] Foreign Application Priority Data

Feb. 10, 1978 [FR] France ............................ 78 03809

[51] Int. Cl.³ .................. B64C 27/32; F16C 15/00
[52] U.S. Cl. .................................. 416/145; 416/500
[58] Field of Search ............... 416/145, 144, 500; 74/574

[56] References Cited

U.S. PATENT DOCUMENTS

| 2,576,105 | 11/1951 | Childs | 416/145 X |
|---|---|---|---|
| 3,219,120 | 11/1965 | Hooper | 416/145 |
| 3,298,443 | 1/1967 | Burkam et al. | 416/145 X |
| 3,387,505 | 6/1968 | Rumsey | 74/574 |
| 3,509,971 | 5/1970 | Gerstine et al. | 416/500 X |
| 3,910,720 | 10/1975 | Vincent | 416/145 |
| 4,044,628 | 8/1977 | Jacks | 74/574 |
| 4,145,936 | 3/1979 | Vincent et al. | 74/574 |
| 4,160,390 | 7/1979 | Spaetgens | 74/574 |

FOREIGN PATENT DOCUMENTS

| 1010611 | 6/1952 | France | 74/574 |
|---|---|---|---|
| 1051106 | 1/1954 | France | 74/574 |
| 1271872 | 8/1961 | France | 74/574 |
| 1287949 | 2/1962 | France | 74/574 |

*Primary Examiner*—Everette A. Powell, Jr.
*Attorney, Agent, or Firm*—Karl W. Flocks

[57] ABSTRACT

The invention relates to a device for damping the vibrations of the rotor of a rotary-wing aircraft. This device comprises a flapping weight concentrated near the rotor axis and at least three resiliently deformable elements, such as helical springs. The deformable elements are radially biassed in directions regularly distributed around the rotor axis. The inner ends of the deformable elements directly bear on the flapping weight. Their outer ends directly bear on rigid structure elements, rigidly secured to the rotor hub, so that the biassed deformable elements apply statically balanced centripetal thrusts to the flapping weight.

14 Claims, 4 Drawing Figures

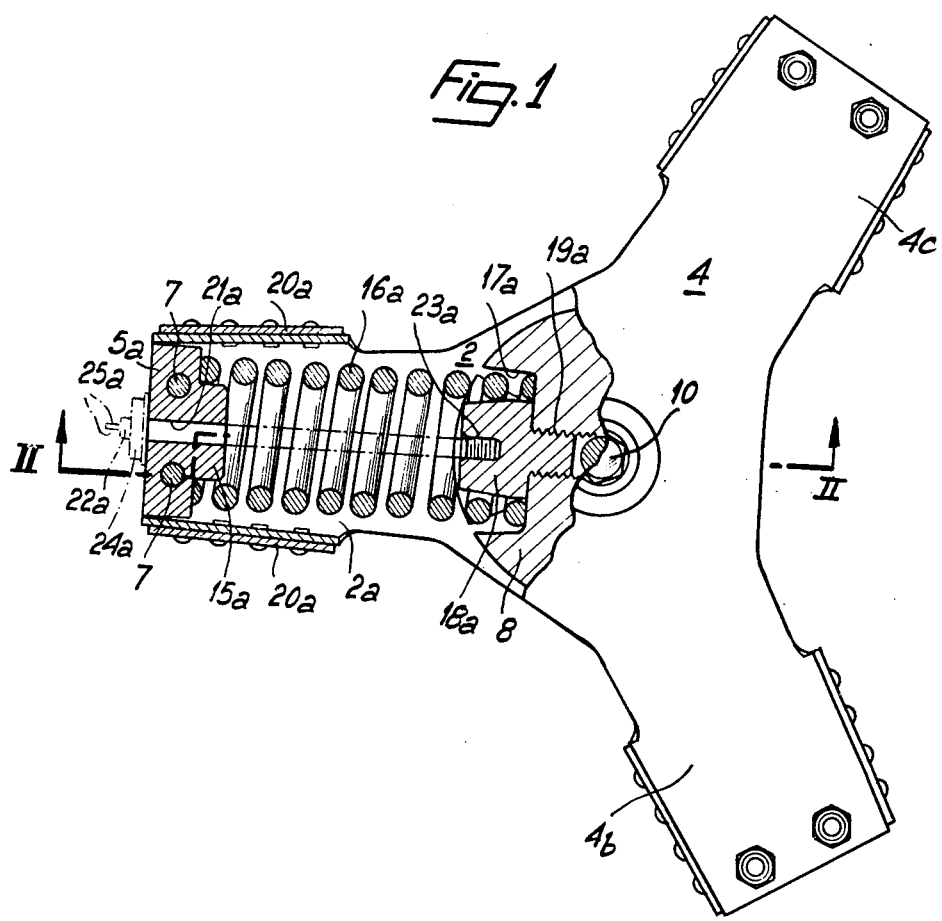

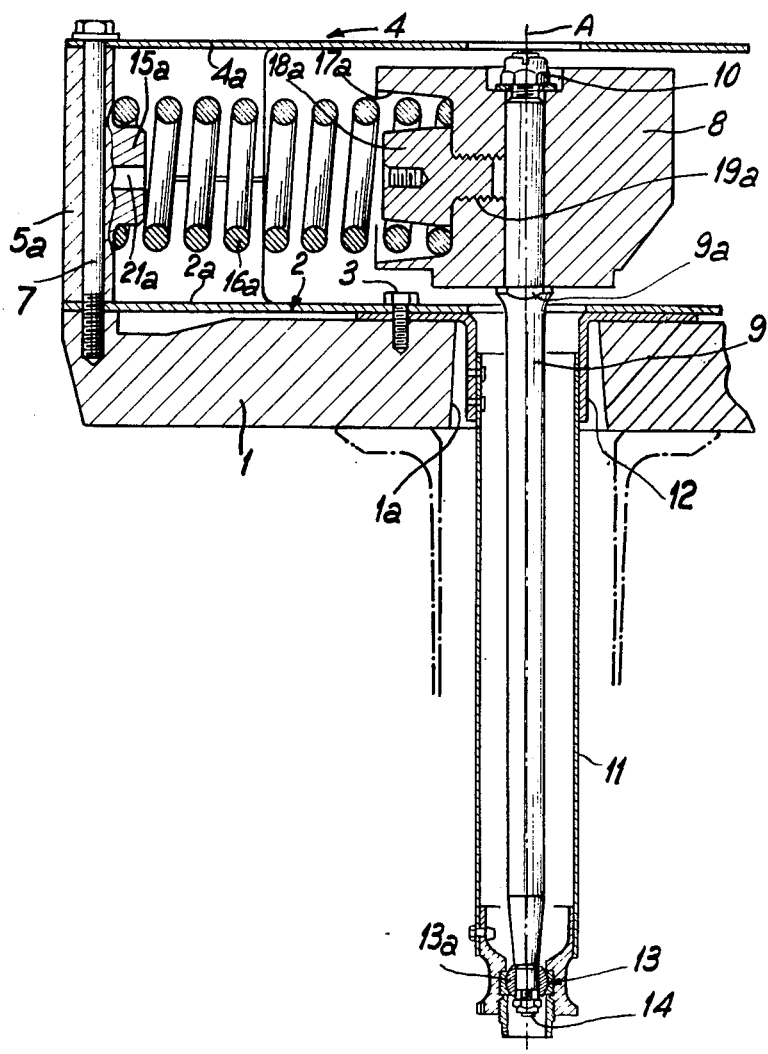

DEVICE FOR DAMPING THE VIBRATIONS OF A ROTARY-WING AIRCRAFT ROTOR

This invention relates to a resonator device for damping the vibrations of a rotary-wing aircraft rotor.

The vibrations which arise in rotary-wing aircraft, more particularly helicopters, are of such an extent as to limit the maximum speed of the aircraft, reduce its structural strength and disturb passenger comfort inasmuch as these vibrations produce alternating stresses and oscillations throughout the aircraft and more particularly in the aircraft cabin.

A considerable number of devices have already been proposed for damping the vibrations produced by each rotor of a rotary-wing aircraft. Many of these known devices comprise resonators.

In a first group of known resonator devices, the resonators are disposed at various places in the fuselage of the rotary-wing aircraft, more particularly a helicopter, and possibly on its flight control elements. The resonators are e.g. strip or spring resonators each oscillating at its natural frequency with an amplitude and in a phase such as to absorb at least partly the alternate forces transmitted to said resonator from its fixture. Resonator devices of this kind have a number of disadvantages. Since a resonator must be mounted at every place in the aircraft where it is required to damp vibrations, the weight of the aircraft is thereby increased considerably. The vibration-damping effect provided by each resonator is limited to the region near the place where it is mounted, while the same resonator may have the effect of increasing vibrations elsewhere in the aircraft. Finally, since the natural frequency of each resonator is usually fixed, the resonator is effective only in predetermined vibratory conditions of the aircraft, more particularly at a predetermined rotor speed.

In endeavours to obviate the latter disadvantages resonators having a variable natural frequency, specially a natural frequency which can be adapted automatically to the various vibratory conditions of the aircraft, have been devised. Automatic control of the resonator natural frequency calls of course for considerable mechanical and electronic facilities which makes such devices expensive and relatively unreliable, so that they are unsuitable for lightweight low-cost helicopters.

In a second group of known resonator devices the resonator is placed immediately above the rotor hub and is energized directly thereby, and the natural frequency of the resonator is automatically adapted to the frequency of the rotor-produced vibrations, the latter frequency being proportional to rotor speed. In one known device of this kind the automatic adaptation is achieved by the provision in the resonator of bob-weights which are articulated to the rotor hub and which experience centrifugal force and the opposing force of springs.

U.K. Patent specification No. 1,465,266, filed by WESTLAND AIRCRAFT LIMITED on Apr. 26, 1973, discloses a vibration-damping device for aircraft rotors, the device comprising a circular weight resiliently mounted around the axis of rotor rotation so as to co-rotate with the rotor. The circular weight is preferably of inverted channel cross-section and is borne by a structure of link parallelograms. The resilience is provided in the main by helical springs which bear at their inner ends on the inner ends of radial cylinders, the outer ends of the cylinders being connected to the circular weight, the helical springs bearing at their outer ends on pistons adapted to slide in the respective cylinders and having rods which extend freely through the respective cylinder inner ends and which are connected to a spindle prolonging the rotor shaft axially, so that the helical springs apply radial pulling forces to the circular weight. This known device is highly complex mechanically, expensive and unreliable. Its vibrations are accompanied by considerable friction at the links of its parallelograms and in the elements on which the ends of the helical springs bear. Consequently, the "sharpness" of the resonance of the oscillating circular weight is reduced considerably, with the result of a considerable reduction in the effectiveness of this known resonator device.

French Patent Application No. EN 77 01396, filed by WESTLAND AIRCRAFT LIMITED on Jan. 19, 1977, discloses another vibration-damping device also comprising a circular weight so mounted resiliently around the axis of rotor rotation as to co-rotate with the rotor; in this construction the circular weight is connected to a central element rigidly secured to the rotor shaft by a number of flexible spiral arms which bear the circular weight as well as rotating the same. This device too has the two disadvantages of being a difficult construction mechanically and of being expensive.

A chief object of this invention is to achieve a resonator device for damping the vibrations of a rotary-wing aircraft rotor having a hub, the device comprising:

a flapping weight disposed at the top of the rotor hub and concentrated near the rotor axis;

means for returning said weight resiliently towards an inoperative position centred on such axis, said means comprising at least three resiliently deformable elements, which are each radially biassed in directions distributed regularly around the rotor axis, the inner ends of said elements directly bearing on said flapping weight; and rigid structure elements, rigidly secured to the rotor hub, the outer ends of said resiliently deformable elements bearing on said structure elements so as to apply statically balanced centripetal thrusts to said flapping weight.

Since the flapping weight of the resonator according to the invention is concentrated near the rotor axis and is continuously returned theretowards by the centripetal thrusts of the resiliently deformable elements, the only forces which can possibly act on the flapping weight are very reduced pivoting torques around horizontal axes, such torques being unable to cause interfering vibratory modes which might disturb resonator operation, such as may occur specially with vibration dampers comprising a circular weight mounted resiliently around the axis of rotor rotation; the point is that a circular weight of the latter kind which is not concentrated near the rotor axis i.e., whose radius of rotation around such axis is relatively large may experience in operation considerable pivoting torques causing interfering vibratory modes likely to disturb resonator operation. Another advantage of the resonator device according to this invention is its great constructional simplicity. Unlike the prior art previously described, the device according to the invention has no parallelogram link type support elements nor flexible spiral arms, the disadvantages of which have been emphasized. The device according to this invention is therefore devoid of articulations and other moving connections likely to give rise to considerable friction when the flapping weight moves; consequently, the flapping weight of the resonator according to this invention can have a very sharp resonance, an advantageous feature for effective damping of the vibrations produced by a rotor of a rotary-wing aircraft.

In a first embodiment of the resonator device according to this invention, the flapping weight is in shape cylindrical with its axis vertical, is made of a dense material and is secured to the top end of a rod which extends into the hollow rotor shaft and whose bottom end is coupled via a swivel joint with the wall of a tubular element also extending into the said hollow shaft and secured by a flange to the central part of the rotor hub.

In this first embodiment of the device according to this invention, any pivoting movements which the flapping weight may make around horizontal axes extending through the centre of this swivel joint can have only very reduced vertical components, which are all the more reduced because the flapping weight is further away from the swivel joint and the resilient return elements are relatively stiff, so that the flapping weight vibrates substantially parallel to a plane perpendicular to the axis of rotor rotation, such plane also being the plane of the rotor vibrations which it is required to damp.

According to another advantageous feature of the invention, the rigid structure elements on which the spring outer ends bear comprise a bottom plate secured to the rotor hub and a top plate, the plates preferably being cut to the shape of a bottom star and a top star, the corresponding star arms extending respectively below and above the springs and being interconnected at their outer ends by rigid bracing members on which the springs bear.

This advantageous feature just described may be of use more particularly in a second embodiment of the resonator device according to this invention wherein the flapping weight, through which an axial bore of predetermined diameter extends, is engaged by way of the bore on a spindle which extends the rotor shaft axially and whose diameter is appreciably less than the diameter of the bore in the flapping weight, and sets of resilient studs are introduced between, on the one hand, the bottom and top parts of the flapping weight and, on the other hand, the rigid bottom and top plates.

This second embodiment of the invention in which the resilient studs can be made for instance of an elastomer in particularly advantageous by facilitating adaptation of the respective stiffnesses of the helical springs and of the elastomeric members to ensure that the flapping weight vibrates parallel to a plane dead perpendicular to the axis of rotor rotation—i.e., to the plane of the rotor vibrations which it is required to damp.

Two embodiments of the resonator device according to this invention for damping the vibrations of the main rotor of a helicopter will be described hereinafter and are shown diagrammatically in the accompanying drawings.

In the drawings:

FIG. 1 is a plan view of the first embodiment with parts cut away and in partial section;

FIG. 2 is a section on the line II—II of FIG. 1;

Figure 4:
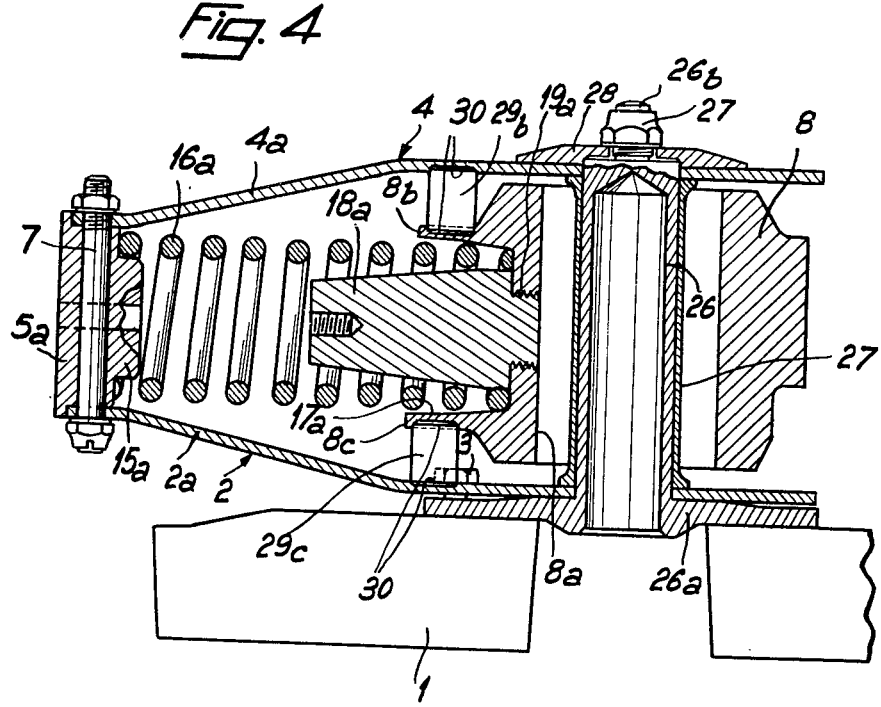
FIG. 4 is a section on the line IV—IV of FIG. 3.

Referring to FIGS. 1 and 2, there can be seen a hub 1, e.g. a spider-like or star-shaped hub, of known kind of a helicopter rotor. Hub 1 is of course secured by any appropriate means to the top end of the rotor shaft (not shown), which in the present case must be a hollow shaft. Hub 1 is also formed with an axial orifice 1a. In this embodiment the device according to this invention comprises a rigid bottom plate 2, e.g. of sheet metal, which is secured to the central part of hub 1 by a ring of bolts 3, and a rigid top plate 4, e.g. of sheet metal; the two plates 2, 4 are cut to the shape of a bottom star and a top star respectively each having three arms, as can be seen in FIG. 1. The corresponding outer ends, e.g. 2a and 4a, of the two stars 2, 4 are interconnected by rigid bracing members, as 5a, and two bolts, as 7, serve to connect the ends of two corresponding arms, e.g. 2a and 4a, of the two stars 2, 4 to the corresponding bracing member 5a and to secure the whole to the periphery of hub 1. A weight 8 which is in shape cyindrical and has a vertical axis and is made of a dense substance such as steel is secured to the top end of a rod 9; accordingly, the weight 8 can be formed with an axial bore for engaging it on the top end of rod 9 as far as a flange 9a against which the weight 8 is clamped by a screw 10 screwed to the screwthreaded top end of rod 9. The same extends downwardly in a tubular element 11 which in turn extends into the hollow shaft (dots and dashes) of the rotor and is secured to the central part of the hub 1 by way of a collar 12 and the ring of bolts 3 also serving to secure the inner part of the member 2. At the bottom end of the tubular 11 there is a swivel joint 13 whose ball 13a is formed with a diametric bore in which the bottom end of rod 9 is secured e.g. by a nut 14.

The internal surface of each bracing member, as 5a has a central cylindrical projection, as 15a, engaged by the outer end of a helical spring, as 16a, which, as can be seen in FIG. 1, is compressed radially and bears directly at its inner end on the weight 8, specially on the base of a recess, as 17a, with which the outer wall of the weight 8 is formed opposite the projection 15a.

In the present embodiment, additional weights, as 18a, are disposed one each in the helical springs, as 16a, and screwed into a tapped bore 19a in the base of the corresponding recess 17a.

The embodiment shown in FIGS. 1 and 2 and hereinbefore described comprise three-armed stars or the like 2, 4 and three helical springs, as 16a, which are biassed radially in directions distributed regularly around the axis A of rotor rotation—i.e., the star arms are at a 120° spacing from one another. Of course, the springs, as 16a, since they are identical to one another and are biassed, apply to the weight 8 three centripetal thrusts which balance out statically when the rotor is stationary so as to maintain the weight 8 in an inoperative position centred on the axis A of rotor rotation.

When the rotor rotates, the weight 8 at the top end of rod 9 experiences reduced movements around horizontal axes passing through the centre of the ball 13a but is returned resiliently by the springs, as 16a, towards its inoperative position just described. Consequently, the weight 8 vibrates in the vicinity of its inoperative position in directions substantially perpendicular to the axis A—i.e., parallel to the top plane of the rotor hub 1, and the rotor vibrations required to be damped are also operative parallel to the latter plane.

To strengthen the rigid structure embodied by the memebers 2, 4 and the bracing members, as 5a, it is proposed in this embodiment to provide a connection as well between the end parts of the arms, as 2a, 4a, of the members 2 and 4 by riveted vertical plates, as 20a (FIG. 1).

The device shown in FIGS. 1 and 2 is assembled as follows:

First, the collar 12 carrying the tube 11 and the swivel joint 13 and, on top, the bottom star 2 are secured to the central part of the hub 1 by means of the ring of bolts 3. The bottom end of rod 9 is then engaged in the bore in swivel or ball 13a and immobilized by means of the nut 14. The flapping weight 8 is then engaged on the top part of the rod 9 as far as the flange 9a and secured by means of the nut 10. After the three additional weights, as 18a, have been screwed into the tapped bores, as 19a, the inner ends of the helical springs, as 16a, are engaged in their respective recesses, as 16a, around the additional weights, as 18a. The three bracing members, as 5a, are then assembled seriatim as follows:

A screwthreaded rod 22a (shown in broken line in FIG. 1) is introduced through a plain bore, as 21a, of appropriate diameter with which the bracing member 5a is formed at the centre of the additional weight, as 18a, and the inner end of rod 22a is screwed into a tapped bore 23a at the centre of the additional weight 18a. That end of the rod 22a which extends out of the member 5a has a washer placed on it and a nut 24a screwed on it, the nut and washer bearing on the outer surface of the member 5a. By means of a spanner which is engaged with two flats or facets 25a at the outer end of rod 22a, the same is retained while the nut 24a is rotated in the appropriate direction to move the member 5a towards the weight 8, the spring 16a being compressed; the point is that the latter and the similar springs must be of a stiffness such that they cannot be precompressed or biassed just as a result of the member 5a being pushed towards the weight 8. The compression of the spring 16a is adequate when the apertures in the member 5a for the bolts, as 7, register with the corresponding apertures at the end of the arm 2a of the bottom star 2. The top star 4 is then placed above the three members, as 5a, and assembly can then be completed by screwing up the three pairs of bolts, as 7, to connect the various elements, 2, 4, 5 to the periphery of the rotor hub 1 in the manner visible in the left-hand part of FIG. 2. The nuts, as 24a, and the threaded rods, as 22a, are then unscrewed.

Figure 3:
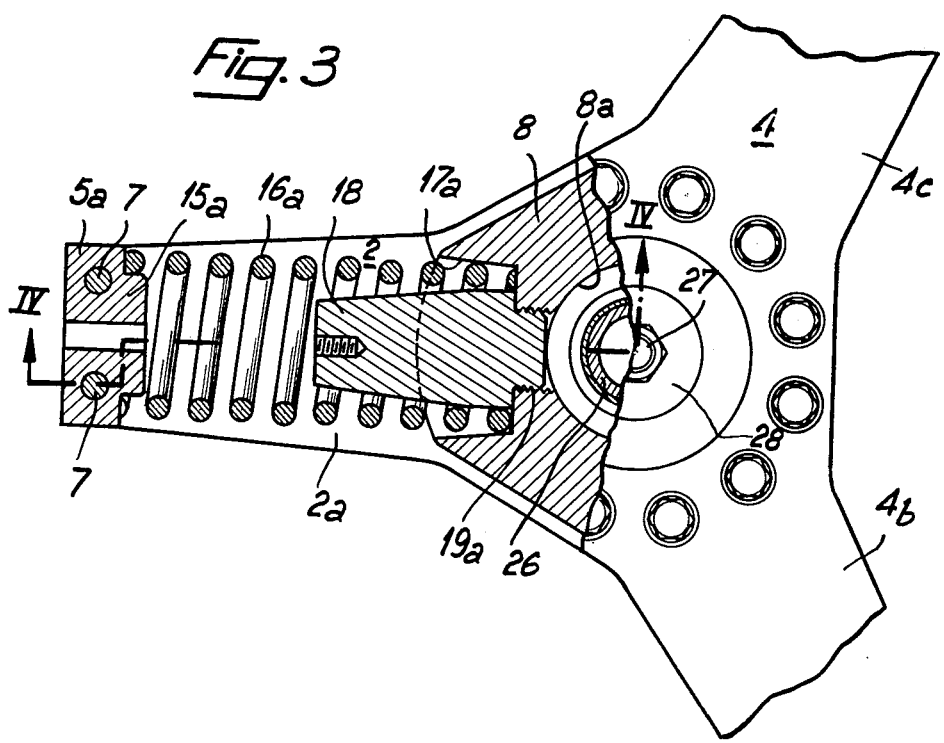
FIG. 3 is a plan view of the second embodiment with parts broken away and in partial section.

FIGS. 3 and 4, which show the second embodiment of the invention, use the same references as in FIGS. 1 and 2 for like elements, and so that latter need not be described in detail. The main difference between the embodiment shown in FIGS. 3 and 4 and the embodiment shown in FIGS. 1 and 2 and hereinbefore described is that in the embodiment shown in FIGS. 3 and 4 the flapping weight 8 is formed with a transverse bore 8a via which it is engaged on a spindle 26 disposed in axial extension of the rotor shaft (not shown), the diameter of the spindle 26 being appreciably less than the diameter of the bore 8a. In the embodiment shown the spindle 26 extends, in the axial direction mentioned, between the bottom star 2 and the top star 4. At its bottom end the spindle 26 has a flange 26a on which the central part of the bottom star 2 bears, the same and the flange 26a being secured to the central part of the hub 1 by a ring of bolts 3. A cylindrical bracing member 27 is engaged on the spindle 26, e.g. in an easy sliding fit, between the members 2 and 4, the central apertures of which bear on the respective bottom and top ends of the cylindrical member 27. A screwthreaded rod element 26b is rigidly secured to the top end of spindle 26 so as to extend axially thereof above the top star 4. The system of rigid members 2, 4 5a etc. is also secured to the top end of the spindle 26 by a nut 27 which is screwed to the screwthreaded rod 26b with the interposition of a washer 28. Also, groups of resilient studs are introduced between, on the one hand, the top and bottom parts of the flapping weight and, on the other hand, the bottom and top stars 2 and 4. In the particular embodiment being studied, at least three resilient studs, as 29b, are disposed between a grooved flange 8b of the top part of the weight 8 and the arms, as 4a of the top star 4; also, three resilient studs, as 29c, are disposed between a grooved flange, as 8c, of the bottom part of the weight 8 and the arms, as 2a, of the bottom star 2. The resilient studs, as 29b and 29c are in this embodiment solid cylinders which are made of an elastomer and which are biased (precompressed) and secured in grooves, as 30, formed in the flanges, as 8b and 8c, and in the corresponding surfaces of the star arms, as 2a and 4a. The characteristics of the substance used for the studs, as 29b and 29c, can be such that such studs, which are in shape cylindrical, have high compression strength in the direction parallel to the rotor axis but relatively reduced shear strengths in the directions perpendicular to the rotor axis. It will therefore be apparent that movements of the weight 8 relatively to the rigid elements 2, 4, 5 and specially the vibrations imparted to the weight 8, are limited substantially to directions perpendicular to the axis of rotation—i.e., parallel to the vibrations of the rotor. However, the system is of a size and design such as to limit the amplitude of the vibrations of the weight 8 in directions perpendicular to the rotor axis to a value appreciably less than the distance between the bore 8a in the weight 8 and the bracing member 27. The studs, as 29b and 29c, can have more particularly a laminated structure of known kind. The number of resilient studs is optional; theoretically, the number of bottom short resilient studs and the number of top resilient studs should be at least equal to the number of arms of each of the two stars 2 and 4—i.e., at least 3.

The scope of this invention is not limited to the two embodiments hereinbefore described. The rigid structure elements, as 2 and 4, instead of being star-shaped, could be embodied by flat discs or by shallow dished members assembled by way of their edges either by bracing members, as hereinbefore described, or by members in the shape of a circle arc or even by a member in the form of a closed ring, although the latter construction would have the disadvantage of increasing the moment of inertia of the rotor hub. Also, the number of helical springs or of equivalent resilient elements, although it should be at least three, need not necessarily be the same as the number of rotor blades.

We claim:

1. A resonator device for damping the vibrations of a rotary-wing aircraft rotor having a hub, the device comprising:

a flapping weight disposed at the top of the rotor hub and concentrated near the rotor axis;

means for returning said weight resiliently towards an inoperative position centred on such axis, said means comprising at least three resiliently deformable elements, which are each radially biassed in directions distributed regularly around the rotor axis, the inner ends of said elements directly bearing on said flapping weight; and rigid structure elements, rigidly secured to the rotor hub, the outer ends of said resiliently deformable elements bearing on said structure elements so as to apply statically balanced centripetal thrusts to said flapping weight.

2. A device according to claim 1 wherein said flapping weight is in shape cylindrical with its axis vertical, is made of a dense material and is secured to the top end of a rod extending into the hollow rotor shaft, the bottom end of said rod being coupled through a swivel joint with the inner wall of a tubular element also extending into said hollow rotor shaft and secured by a flange to the central part of the rotor hub.

3. A device according to claim 1 wherein the resiliently deformable elements are helical springs.

4. A device according to claim 3 wherein the rigid structure elements on which the spring outer ends bear comprise a bottom plate secured to the rotor hub and a top plate, said plates being shaped as a bottom star and a top star respectively, each pair of bottom and top star arms extending respectively below and above one of said springs and being interconnected at their outer ends by a rigid bracing member on which said one spring bears.

5. A device according to claim 4 wherein said flapping weight, having an axial through-bore of predetermined diameter, is engaged by said bore on a spindle extending the rotor shaft axially and having a diameter substantially less than the diameter of the through-bore in said flapping weight, a first set and a second set of resilient studs being inserted between said flapping weight and said bottom and top stars respectively.

6. A device according to claim 5 wherein at least three resilient studs are arranged symmetrically between a grooved flange of the top part of said flapping weight and the arms of said top star, and at least three resilient studs are arranged symmetrically between a grooved flange of the bottom part of said flapping weight and the arms of said bottom star.

7. A device according to claim 6 wherein said resilient studs are prestressed in facing grooves arranged in said flapping weight and in the respective surfaces of said star arms.

8. A device according to claim 5 wherein said resilient studs are elastomeric.

9. A device according to claim 5 wherein said top star is secured to the top part of said axial spindle, a hollow cylindrical member preferably engaging on such spindle between said top and bottom stars.

10. A device according to claim 4 wherein the inside surface of each bracing member comprises a central cylindrical projection engaged by the outer end of the respective helical spring.

11. A device according to claim 4 wherein bolts are provided for securing together said bracing members, the outer ends of the respective arms of said bottom and top stars and the periphery of the rotor hub.

12. A device according to claim 1 wherein said flapping weight is adjustable by means of additional weights.

13. A device according to claim 12 wherein said additional weights are arranged in said helical springs, and are screwed into tapped bores in the outside wall of said flapping weight.

14. A device according to claim 13 wherein said tapped bores are arranged in the bottom of recesses formed in the outer wall of said flapping weight to receive the inner ends of said helical springs.

* * * * *